(12) United States Patent
Yoneda et al.

(10) Patent No.: US 12,091,841 B2
(45) Date of Patent: Sep. 17, 2024

(54) WORK MACHINE MANAGEMENT SYSTEM AND WORK MACHINE MANAGEMENT DEVICE

(71) Applicant: Hitachi Construction Machinery Co., Ltd., Tokyo (JP)

(72) Inventors: Tomohiro Yoneda, Tokyo (JP); Satoshi Inose, Tokyo (JP); Tomohiro Yoshida, Tokyo (JP); Ayato Iwasaki, Ibaraki (JP); Takashi Okumura, Tokyo (JP); Hiroyuki Konno, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 303 days.

(21) Appl. No.: 17/640,148

(22) PCT Filed: Dec. 28, 2020

(86) PCT No.: PCT/JP2020/049153
§ 371 (c)(1),
(2) Date: Mar. 3, 2022

(87) PCT Pub. No.: WO2021/140992
PCT Pub. Date: Jul. 15, 2021

(65) Prior Publication Data
US 2022/0307237 A1    Sep. 29, 2022

(30) Foreign Application Priority Data
Jan. 7, 2020    (JP) .................................. 2020-000653

(51) Int. Cl.
*E02F 9/26*    (2006.01)
*E02F 9/20*    (2006.01)
(Continued)

(52) U.S. Cl.
CPC .............. *E02F 9/267* (2013.01); *E02F 9/205* (2013.01); *E02F 9/2054* (2013.01);
(Continued)

(58) Field of Classification Search
CPC ......... E02F 9/267; E02F 9/205; E02F 9/2054; G05B 23/0283; G07C 5/006; G07C 5/008; G07C 5/0825
See application file for complete search history.

(56) References Cited

U.S. PATENT DOCUMENTS

| 9,013,289 B2 | 4/2015 | Nishikawa et al. |
| 2013/0342340 A1 | 12/2013 | Nishikawa et al. |

(Continued)

FOREIGN PATENT DOCUMENTS

| JP | 3591089 B2 | 11/2004 |
| JP | 2008-180024 A | 8/2008 |

(Continued)

OTHER PUBLICATIONS

English translation of KR 20080056864 A (Year: 2008).*
(Continued)

*Primary Examiner* — Anshul Sood
*Assistant Examiner* — Matthew Ho
(74) *Attorney, Agent, or Firm* — Crowell & Moring LLP

(57) ABSTRACT

The present disclosure provides a work machine management system that can predict the maintenance timing of a work machine with higher accuracy than conventional techniques. A work machine management system 100 of the present disclosure includes an input/output unit 121 and a processing unit 122. The input/output unit 121 receives from work machines 200 positional information PI and operation information OI on the work machines 200, and also receives from a geographical information system server 300 geological information GI on an area where the work machines 200

(Continued)

are to perform an operation, based on the positional information PI. The processing unit 122 predicts the maintenance timing of each work machine 200 based on the operation information OI and the geological information GI. In response to a request from an external portable terminal 130, the input/output unit 121 outputs to the portable terminal 130 data on an alert based on the maintenance timing of the work machine 200 predicted by the processing unit 122.

6 Claims, 11 Drawing Sheets

(51) Int. Cl.
  *G05B 23/02* (2006.01)
  *G07C 5/00* (2006.01)
  *G07C 5/08* (2006.01)
(52) U.S. Cl.
  CPC ......... *G05B 23/0283* (2013.01); *G07C 5/006* (2013.01); *G07C 5/008* (2013.01); *G07C 5/0825* (2013.01)

(56) References Cited

U.S. PATENT DOCUMENTS

| | | | |
|---|---|---|---|
| 2016/0237657 A1 | 8/2016 | Carpenter et al. | |
| 2017/0352199 A1* | 12/2017 | Finley | G06T 7/13 |
| 2018/0257657 A1* | 9/2018 | Blank | G05D 1/0219 |

FOREIGN PATENT DOCUMENTS

| | | | | | |
|---|---|---|---|---|---|
| JP | 2012-225004 | A | | 11/2012 | |
| JP | 2014-153929 | A | | 8/2014 | |
| JP | 2015-184144 | A | | 10/2015 | |
| JP | 2015-214838 | A | | 12/2015 | |
| JP | 5827425 | B1 | * | 12/2015 | ......... G05B 23/0232 |
| JP | 2018-112065 | A | | 7/2018 | |
| KR | 20080056864 | A | * | 6/2008 | |
| KR | 20190051250 | A | * | 5/2019 | |

OTHER PUBLICATIONS

English translation of JP-5827425-B1 (Year: 2015).*
English translation of KR 20190051250 A (Year: 2019).*
International Search Report (PCT/ISA/210) issued in PCT Application No. PCT/JP2020/049153 dated Mar. 16, 2021 with English translation (five (5) pages).
Japanese-language Written Opinion (PCT/ISA/237) issued in PCT Application No. PCT/JP2020/049153 dated Mar. 16, 2021 (four (4) pages).
Chinese-language Office Action issued in Chinese Application No. 202080060047.0 dated Oct. 20, 2022 (eight (8) pages).
Chinese-language Office Action issued in Chinese Application No. 202080060047.0 dated Oct. 20, 2022 with English translation (eight (8) pages).
Extended European Search Report issued in European Application No. 20912495.7 dated Jan. 26, 2024 (9 pages).

* cited by examiner

Fig. 3

TBL1

| Identification Information | Operation Date | Total Operation Time [h] | Digging Time [h] | Swivel Time [h] | Fuel Consumption [l/h] | Latitude [°] | Longitude [°] |
|---|---|---|---|---|---|---|---|
| 01 | 1/1/2019 | 1000 | 650 | 500 | 20 | 45.1228 | 142.3575 |
| 01 | 1/2/2019 | 1007 | 655 | 504 | 21 | 45.1228 | 142.3569 |
| 01 | 1/3/2019 | 1014 | 659 | 507 | 20 | 41.8234 | 140.6338 |
| ... | ... | ... | ... | ... | ... | ... | ... |

TBL2

| Identification Information | Replacement Date | Parts Number | The Number of Parts Replaced |
|---|---|---|---|
| 01 | 1/1/2018 | a1 | 5 |
| 01 | 7/1/2018 | a1 | 5 |
| ... | ... | ... | ... |

TBL3

| Identification Information | Business Type | Client Name |
|---|---|---|
| 01 | Civil Engineering Work | A Company |
| 02 | Demolition | B Company |
| ... | ... | ... |

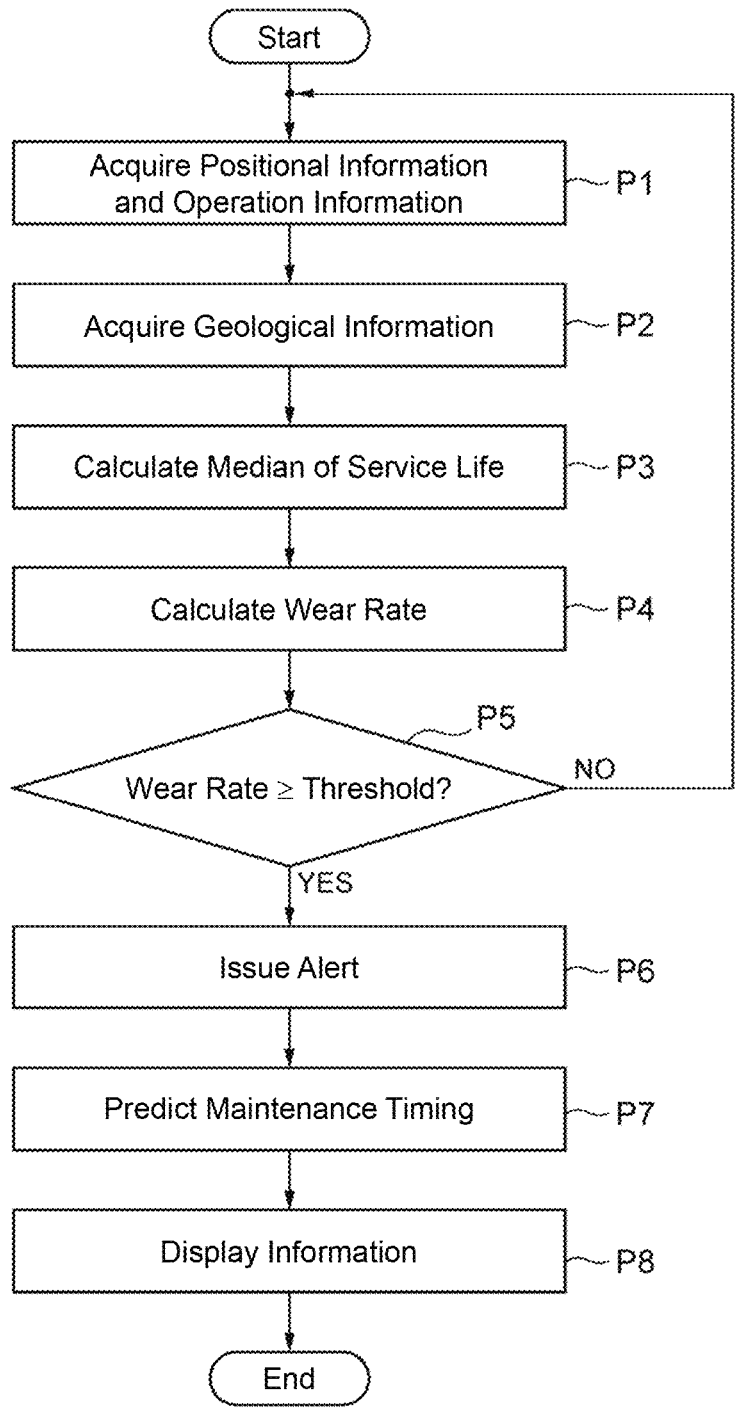

| Identification Information | Longitude [°] | Latitude [°] | Mean Elastic Wave Velocity [km/s] | Geological Name |
|---|---|---|---|---|
| 01 | 45.1228 | 142.3575 | 1.4 | Sand Gravel/Clay |
| 01 | 45.1228 | 142.3569 | 1.5 | Terrace Deposit |
| 01 | 41.8234 | 140.6338 | 2.2 | Conglomerate |
| ... | ... | ... | ... | ... |

WORK MACHINE MANAGEMENT SYSTEM AND WORK MACHINE MANAGEMENT DEVICE

TECHNICAL FIELD

The present disclosure relates to a work machine management system and a work machine management device.

BACKGROUND ART

Conventionally, an invention related to a shovel support device has been known that provides useful information for designing an arrangement plan of a plurality of shovels in a work site (see Patent Literature 1 below). A shovel support device described in Patent Literature 1 includes a display screen that displays an image, a transmitting/receiving circuit with a communication function, and a processing unit that displays an image on the display screen based on information received via transmitting/receiving circuit. In such a shovel support device, the processing unit receives information on the hardness of a ground via the transmitting/receiving circuit, and determines hardness information on the ground based on the received information, and then displays a distribution of the hardness of the ground on the display screen (see claim 1 and paragraph 0008 of Patent Literature 1, for example).

With a method of determining the maintenance timing based on the hardness of a ground and the operation time required for each operation, it is possible to determine the maintenance timing more appropriately than when the maintenance timing is determined based only on the operation time (see paragraph 0006 of Patent Literature 1, for example). According to the aforementioned conventional shovel support device, it is possible to display external factors, and also provide useful information for designing an arrangement plan of shovels in a work site (see paragraph 0010 of Patent Literature 1, for example).

CITATION LIST

Patent Literature

Patent Literature 1: JP 2018-112065 A

SUMMARY OF INVENTION

Technical Problem

In the aforementioned conventional shovel support device, the hardness information on the ground includes information indicating the hardness of the ground of a place where an operation has been performed in the past (see claim 2 of Patent Literature 1, for example). However, when a shovel performs an operation at a site where the shovel has never performed an operation in the past, it would be impossible to predict a load to be applied to the shovel. Therefore, the conventional shovel support device has a problem in the accuracy of prediction of the maintenance timing based on a load applied to the shovel.

The present disclosure provides a work machine management system and a work machine management device that can predict the maintenance timing of a work machine with higher accuracy than conventional techniques.

Solution to Problem

An aspect of the present disclosure is a work machine management system including an input/output unit that receives from work machines positional information and operation information on the work machines, and also acquires from a geographical information system server geological information on an area where the work machines are to perform an operation, based on the positional information; and a processing unit that predicts a maintenance timing of each work machine based on the operation information and the geological information, in which, in response to a request from an external portable terminal, the input/output unit outputs to the portable terminal data on an alert based on the maintenance timing of the work machine predicted by the processing unit.

Advantageous Effects of Invention

The present disclosure can provide a work machine management system and a work machine management device that can predict the maintenance timing of a work machine with higher accuracy than conventional techniques.

BRIEF DESCRIPTION OF DRAWINGS

FIG. 3 illustrates exemplary tables based on the operation information and positional information on the work machine in FIG. 1.

FIG. 4 is a flowchart illustrating a process flow of the work machine management system in FIG. 1.

DESCRIPTION OF EMBODIMENTS

Hereinafter, an embodiment of a work machine management system and a work machine management device of the present disclosure will be described with reference to the drawings.

Figure 1:
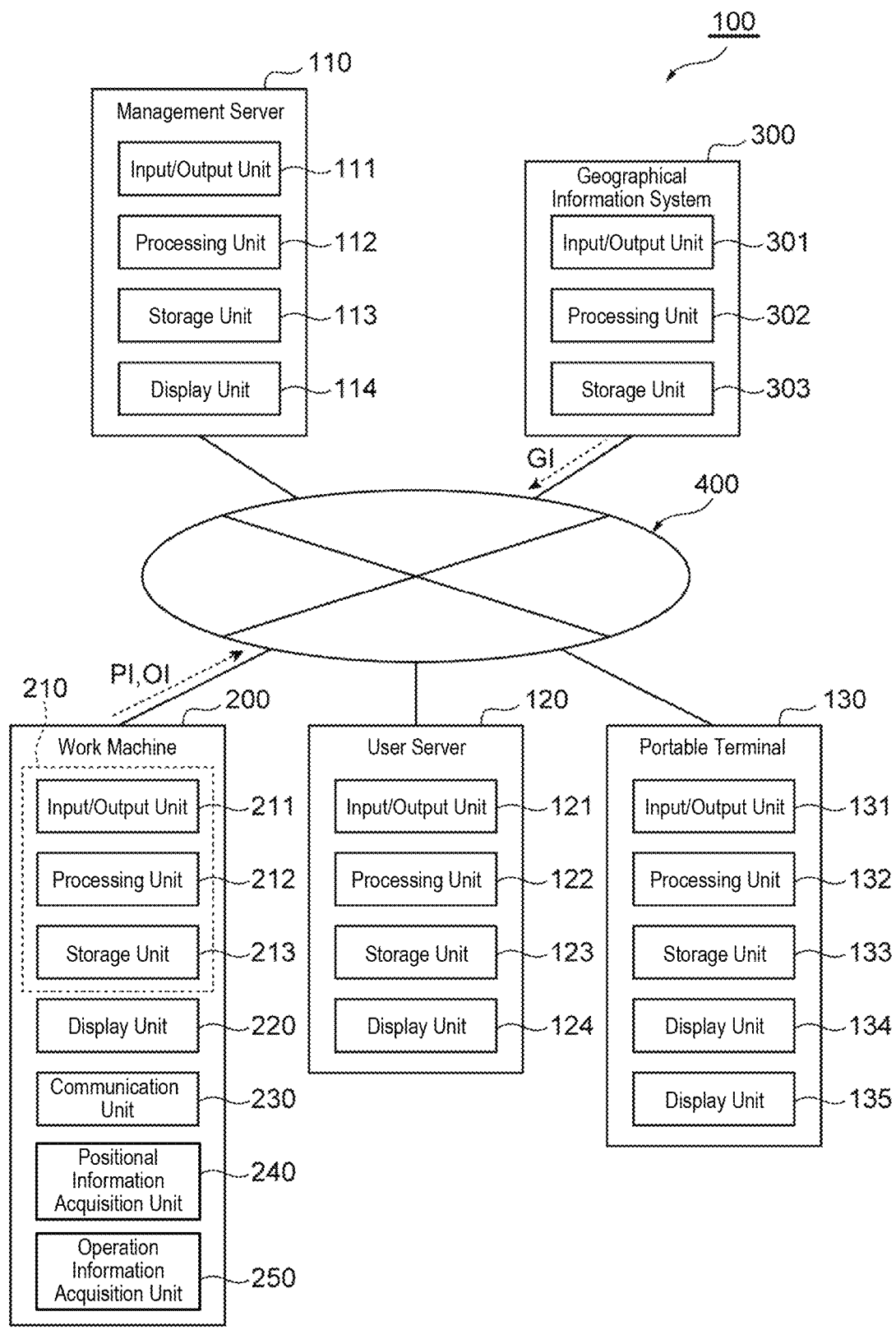
FIG. 1 is a block diagram illustrating an embodiment of a work machine management system of the present disclosure.

FIG. 1 is a block diagram illustrating an embodiment of a work machine management system according to the present disclosure. A work machine management system 100 and a work machine management device of the present embodiment mainly have the following configuration, the details of which will be described later. The work machine management system 100 includes an input/output unit 121 and a processing unit 122. The input/output unit 121 receives from a work machine 200 positional information PI and operation information OI on the work machine 200, and also receives from a geographical information system server 300 geological information GI on an area where the work machine 200 is to perform an operation, based on the positional information PI. The processing unit 122 predicts the maintenance timing of the work machine 200 based on the operation information OI and the geological information GI on the work machine 200. Then, in response to a request from a portable terminal 130, the input/output unit 121 outputs to the portable terminal 130 data on an alert based on the maintenance timing of the work machine 200 predicted by the processing unit 122.

Figure 2:
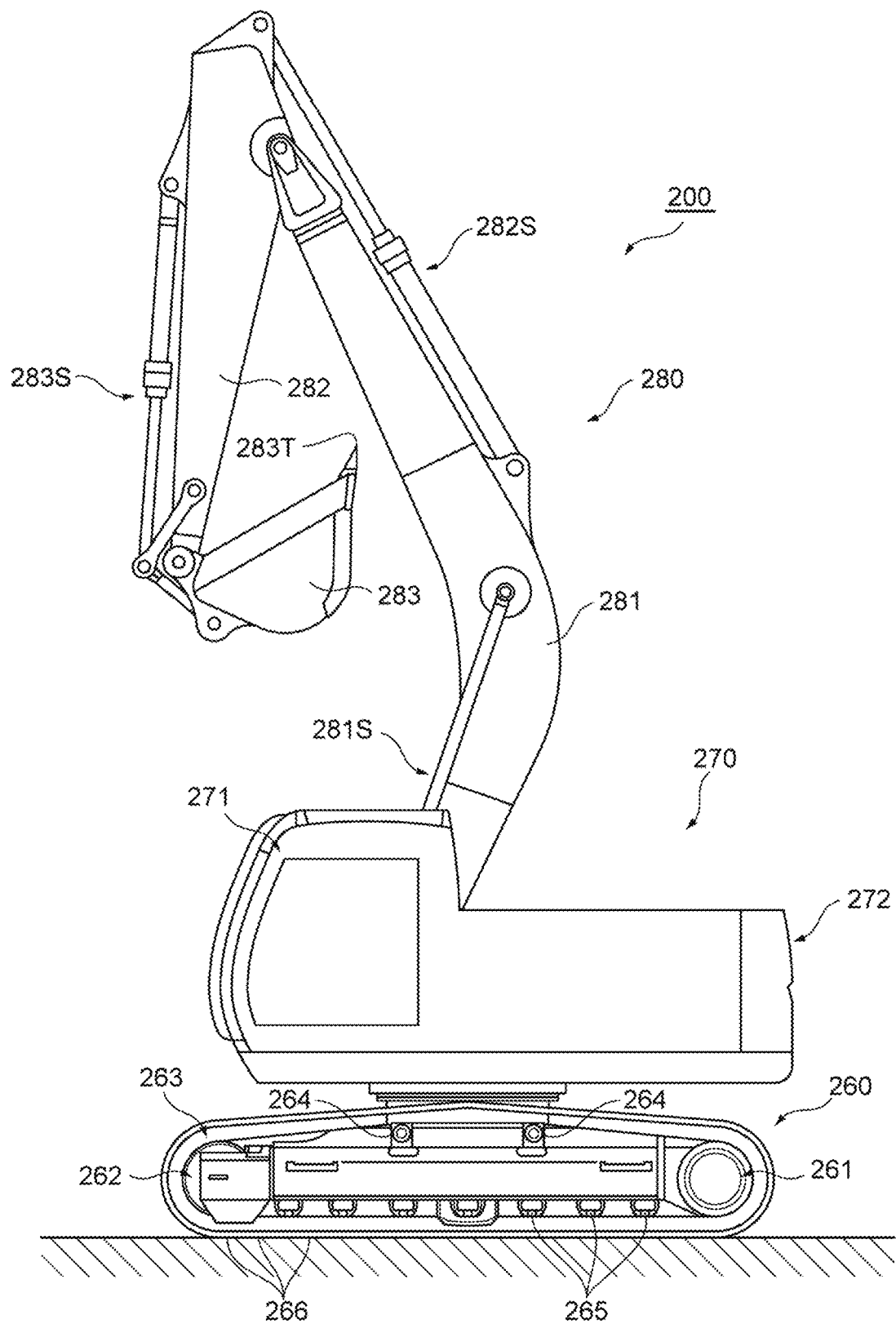
FIG. 2 is a side view illustrating an example of a work machine in FIG. 1.

First, an example of the work machine 200 that is a management target of the work machine management system 100 and the work machine management device of the present embodiment will be described with reference to FIG. 2. FIG. 2 is a side view illustrating an example of the work machine 200 in FIG. 1. The work machine 200 is a hydraulic shovel, for example. It should be noted that the work machine 200 that is a management target of the work machine management system 100 and the work machine management device is not limited to a hydraulic shovel, and may be other work machines, such as a wheel loader, a demolishing/crushing machine, a metal recycling machine, a forestry machine, a rigid dump truck, a crane and a machine for foundation work, and a dual-arm work implement, for example.

The work machine 200 includes a controller 210, a display unit 220, a communication unit 230, a positional information acquisition unit 240, an operation information acquisition unit 250, a travel unit 260, a swivel body 270, and a front work implement 280, for example.

The controller 210 has one or more microcontrollers that include an input/output unit 211, a processing unit 212, such as a CPU, a storage unit 213, such as a ROM, a RAM, and a hard disk, and a program stored in the storage unit 213, for example. The controller 210 outputs a control signal to each unit of the work machine 200 via the input/output unit 211 to control each unit. In addition, the controller 210 receives a variety types of information output from each unit via the input/output unit 211.

The display unit 220 is arranged in a cabin 271 of the swivel body 270, for example, and displays information, such as an image or characters, based on a control signal output from the controller 210. The communication unit 230 is housed in the swivel body 270, and communicates with the outside. More specifically, the communication unit 230 is connected to an Internet line 400 through wireless communication, for example, and communicates with the work machine management system 100.

The positional information acquisition unit 240 is mounted on the swivel body 270, for example, and acquires the positional information PI on the work machine 200. The positional information acquisition unit 240 includes a satellite positioning system, such as a GPS or a GNSS, for example. The operation information acquisition unit 250 includes a microcontroller and a variety of sensors (not illustrated), for example, and acquires the operation information OI on the work machine 200. It should be noted that the operation information acquisition unit 250 may be replaced with the controller 210 and a variety of sensors (not illustrated), for example.

The operation information acquisition unit 250 includes a speed sensor for measuring the traveling speed of the work machine 200, an angle sensor for measuring the angle of the joints of the front work implement 280, and a swivel angle sensor for measuring the swivel angle of the swivel body 270 with respect to the travel unit 260, for example. In addition, the operation information acquisition unit 250 includes a timer for measuring the total operation time of the work machine 200, the actual work time during which the work machine 200 has performed a specific operation, and the swivel time of the swivel body 270, for example. Further, the operation information acquisition unit 250 includes a fuel gauge for measuring the fuel remaining amount of the work machine 200, for example.

The operation information acquisition unit 250 may also include an input unit, such as a keyboard or a touch panel, for inputting a parts replacement history of the work machine 200 and client information, for example. Alternatively, the operation information acquisition unit 250 may acquire a parts replacement history of the work machine 200 and client information from a management server 110, a user server 120, or the portable terminal 130 of the work machine management system 100 via the input/output unit 211 or the communication unit 230, for example.

The travel unit 260 is a crawler-type travel unit including a sprocket 261, an idler 262, a link assembly 263, an upper roller 264, a lower roller 265, and shoe plates 266, for example. The sprocket 261 is connected to a hydraulic motor, which is driven by a hydraulic unit, via a power transmission mechanism, for example. The link assembly 263 is wound around the sprocket 261, the idler 262, the upper roller 264, and the lower roller 265.

The plurality of shoe plates 266 are attached to the outer side of the annular link assembly 263, and among them, the plurality of shoe plates 266 located on the lower side touch the ground. According to such a configuration, the sprocket 261 rotates when a control signal is output from the controller 210 and the hydraulic unit rotates the hydraulic motor. Accordingly, the annular link assembly 263 having the plurality of shoe plates 266 attached to its outer side rotates around the idler 262, the upper roller 264, and the lower roller 265, thereby causing the work machine 200 to travel.

The swivel body 270 is provided on the travel unit 260 such that it can swivel via a swivel mechanism including a hydraulic motor or an electric motor, for example. The cabin 271 in which an operator sits is provided on one side of the front part of the swivel body 270, and the front work implement 280 is attached to the center of the front part of the swivel body 270 in a vertically rotatable manner, and further, a counterweight 272 is attached to the rear part of the swivel body 270. When the swivel mechanism of the swivel body 270 is driven based on a control signal from the controller 210, for example, the swivel body 270 swivels above the travel unit 260 with its axis of rotation, which lies along the vertical direction perpendicular to the front-rear direction and the right-left direction of the work machine 200, as the center.

The front work implement 280 has a link mechanism in which a boom 281, an arm 282, and a bucket 283 are coupled via joints, for example. The bucket 283 has a tooth 283T attached to its distal end. In addition, the front work implement 280 includes a boom cylinder 281S, an arm cylinder 282S, and a bucket cylinder 283S as hydraulic cylinders that extend or contract with the pressure of hydraulic oil supplied from the hydraulic unit housed in the swivel body 270.

In the front work implement 280, the boom cylinder 281S, the arm cylinder 282S, and the bucket cylinder 283S are supplied with hydraulic oil from the hydraulic unit based on a control signal output from the controller 210, for example. Accordingly, the boom cylinder 281S, the arm cylinder 282S, and the bucket cylinder 283S extend or contract, and respectively drive the boom 281, the arm 282, and the bucket 283, so that a desired operation, such as a digging operation or a leveling operation, can be performed.

Specific parts of the work machine 200 progressively wear with an increase in the actual work time of the work machine 200 due to the influence of the geological conditions of an area where the work machine 200 performs an operation, for example. Herein, examples of wear caused due to the influence of the geological conditions include wear caused by impact or friction when a specific part contacts earth, sand, or rocks on the ground surface, and wear caused by friction between specific parts and earth or sand that has entered into the gap between the parts.

Examples of the parts of the work machine 200 that progressively wear due to impact or friction upon contacting earth, sand, or rocks on the ground surface include the tooth 283T at the distal end of the bucket 283 of the front work implement 280 and the shoe plates 266 of the travel unit 260. In addition, examples of the parts of the work machine 200 that progressively wear due to friction between the parts and earth or sand that has entered into the gap between the parts include the sprocket 261, the idler 262, the link assembly 263, the upper roller 264, and the lower roller 265 of the travel unit 260.

The actual work time of the work machine 200 is the total time during which the work machine 200 has performed a specific operation, that is, the cumulative time during which the work machine 200 has performed a specific operation. Examples of the specific operation of the work machine 200, that is, the operation of the work machine 200 that promotes the wear of the parts of the work machine 200 due to the influence of the geological conditions include the digging operation and the leveling operation of the front work implement 280, the traveling operation of the travel unit 260, and the swivel operation of the swivel body 270 based on the swivel mechanism.

Hereinafter, an exemplary configuration of the work machine management system 100 according to the present embodiment will be described. The work machine management system 100 of the present embodiment is a system that manages pieces of information on a plurality of work machines 200, and predicts the maintenance timing of the individual work machine 200, and then informs a user of the predicted maintenance timing, for example.

In the example illustrated in FIG. 1, the work machine management system 100 includes the management server 110, the user server 120, and the portable terminal 130, for example. It should be noted that the work machine management system 100 may include one or more of the management server 110, the user server 120, and the portable terminal 130, for example. That is, the management server 110 alone, the user server 120 alone, or the portable terminal 130 alone may function as a work machine management device.

The management server 110 is an information processing device owned by the manufacturer of the work machines 200, and includes an input/output unit 111, a processing unit 112, such as a CPU, a storage unit 113, such as a RAM, a ROM, and a hard disk, and a display unit 114. The input/output unit 111 is connected to the Internet line 400, for example. The storage unit 113 stores a variety of pieces of data on the work machines 200 and a variety of programs to be executed by the processing unit 112, for example.

The processing unit 112 executes the variety of programs stored in the storage unit 113, for example. Accordingly, the processing unit 112 acquires the positional information PI and the operation information OI transmitted together with identification information from each of the plurality of work machines 200 via the Internet line 400 and the input/output unit 111, for example. Further, the processing unit 112 creates tables based on the acquired positional information PI and operation information OI on the individual work machines 200, and stores them in the storage unit 113.

FIG. 3 illustrates an example of the tables including an operation daily report table TBL1, a parts replacement history table TBL2, and a client information table TBL3 that are based on the positional information PI and the operation information OI on the work machines 200. Each of such tables is created by the processing unit 112 of the work machine management system 100, and is stored in the storage unit 113, for example, as described above. In each of such tables, identification information is information for identifying the individual work machine 200.

The operation daily report table TBL1 includes, for the identification information on each work machine 200, the operation date, the total operation time, the digging time, the swivel time, and the fuel consumption as the operation information OI, and the latitude and longitude as the positional information PI, for example. The parts replacement history table TBL2 includes, for the identification information on each work machine 200, the parts replacement date, the parts number, and the number of parts replaced as the operation information OI on the work machine 200, for example. The client information table TBL3 includes, for the identification information on each work machine 200, the business type of the user and the user name, that is, the client name, for example.

The user server 120 illustrated in FIG. 1 is an information processing device owned by the user of each work machine 200 purchased from the manufacturer, for example, and also functions as a work machine management device. The user server 120 includes the input/output unit 121, the processing unit 122, a storage unit 123, and a display unit 124 as with the management server 110. In the work machine management system 100 of the present embodiment, the user server 120 has a function of predicting the maintenance timing of each part of the work machine 200. Such a maintenance timing prediction function is not limited to that of the user server 120, and may be provided in the management server 110 or the portable terminal 130. The maintenance timing prediction function will be described in detail later with reference to FIG. 4.

The portable terminal 130 is a portable information processing device, such as a smartphone, a tablet PC, or a notebook PC, owned by a maintenance staff as the manufacturer of the work machine 200 or by an operator as the user of the work machine 200, for example. The portable terminal 130 includes an input/output unit 131, a processing unit 132, a storage unit 133, and a display unit 134 as with the management server 110 and the user server 120. In addition, the portable terminal 130 includes a communication unit 135 that can be connected to the Internet line 400 through wireless communication, for example. The portable terminal 130 requests the user server 120 to send data on an alert based on the maintenance timing of the work machine 200 via the input/output unit 131, for example.

The geographical information system server 300 is a server owned by a public institution, for example, and includes an input/output unit 301, a processing unit 302, such as a CPU, and a storage unit 303, such as a hard disk. The geographical information system server 300 is connected to the Internet line 400 via the input/output unit 301. The processing unit 302 transmits information stored in the storage unit 303 via the input/output unit 301 and the Internet line 400 based on information input via the input/output unit 301.

The storage unit 303 of the geographical information system server 300 stores geographical information. The geographical information is a geological information database including geological information GI on all parts of the country or all parts of the world, for example. The geological information GI includes the geological names of strata at each site in the Quaternary period, for example. The geological names are classified by soil quality and bedrock, for example. The geological names of the soil quality include gravel, sand gravel, sand, silt, and clay, for example.

Bedrock is classified into unconsolidated sediment, sedimentary rock, igneous rock, lava and pyroclastic rock, metamorphic rock, and ore vein, for example. The geological names of unconsolidated sediment include terrace deposit, for example. The geological names of sedimentary rock include conglomerate, sandstone, and siltstone, for example. The geological names of other types of bedrock also include a plurality of names, but specific examples are not illustrated herein. In addition, the geological information GI may include the elastic wave velocity used as an index indicating hardness.

Next, the operation of the work machine management system 100 of the present embodiment will be described with reference to FIG. 4. FIG. 4 is a flowchart illustrating a process flow of the work machine management system 100 of the present embodiment. The work machine management system 100 executes, with the user server 120 as a work machine management device, a process P1 of acquiring the positional information PI and the operation information OI on the plurality of work machines 200, for example. More specifically, the user server 120 operates as follows, for example.

In the process P1, the processing unit 122 of the user server 120 receives the positional information PI and the operation information OI on the work machines 200 stored in the storage unit 113 of the management server 110 via the input/output unit 121 and the Internet line 400, and stores them in the storage unit 123. Herein, the positional information PI and the operation information OI on the work machines 200 are stored in the storage unit 123 of the user server 120 as the operation daily report table TBL1, the parts replacement history table TBL2, and the client information table TBL3 illustrated in FIG. 3, for example.

Next, the work machine management system 100 executes, with the user server 120, a process P2 of acquiring the geological information GI from the geographical information system server 300, for example. More specifically, in the process P2, the user server 120 operates as follows, for example. The processing unit 122 acquires the geological information GI on an area where the plurality of work machines 200 is to perform an operation from the geographical information system server 300 via the input/output unit 121 based on the positional information PI acquired in the previous process P1, for example.

Figure 5:
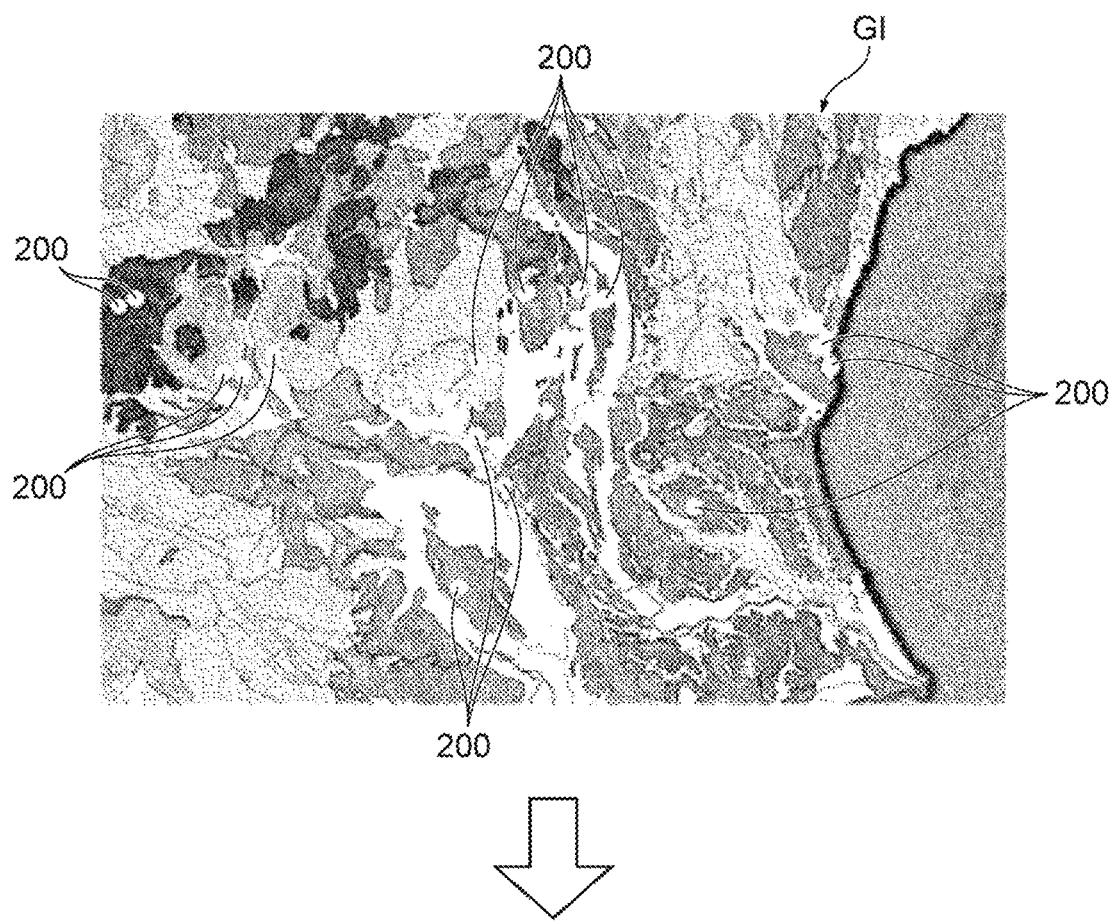
FIG. 5 is a view illustrating a process of acquiring geological information in FIG. 4.

FIG. 5 is a view illustrating the process P2 of acquiring the geological information GI in FIG. 4. The processing unit 122 acquires the geological information GI on an area where the plurality of work machines 200 is to perform an operation from the geographical information system server 300 via the input/output unit 121 based on the latitude and longitude included in the positional information PI on the work machines 200, for example. More specifically, the processing unit 122 acquires the elastic wave velocity and the geological name as the geological information GI for each combination of the identification information on each work machine 200 and the latitude and longitude, for example. It should be noted that the elastic wave velocity is the mean elastic wave velocity corresponding to the geological name, for example.

Next, the work machine management system 100 executes, with the user server 120, a process P3 of calculating the median of the service life of a part of each work machine 200 as illustrated in FIG. 4, for example. Herein, the tooth 283T attached to the distal end of the bucket 283 of the front work implement 280 will be described as an example of the part of each work machine 200 for which the median of the service life is calculated. However, the median of the service life can be similarly calculated for each part of the travel unit 260. Hereinafter, the process P3 will be described more specifically with reference to FIGS. 6 and 7.

Figure 6:
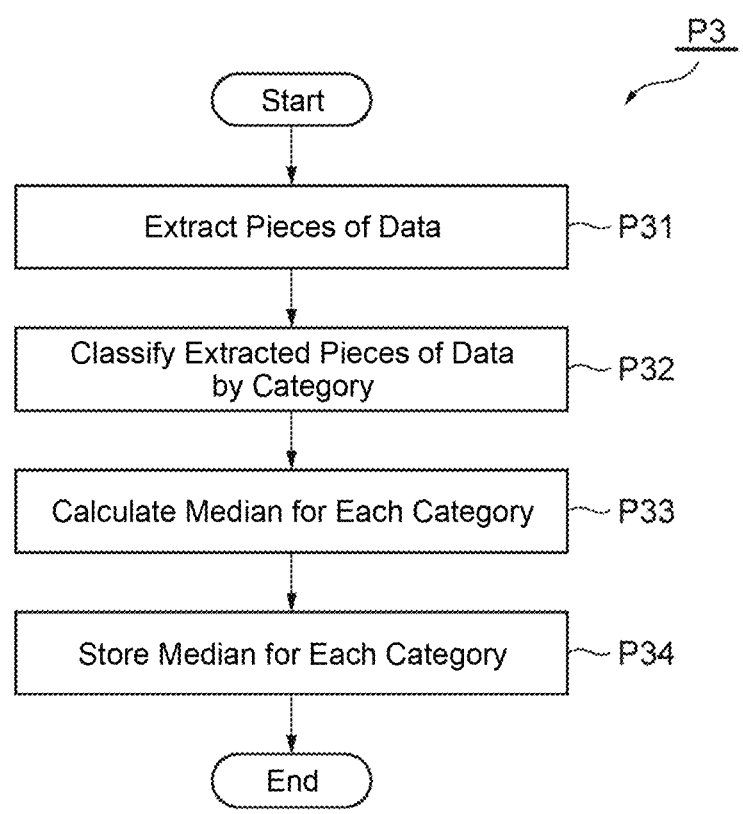
FIG. 6 is a flowchart illustrating the details of a process of calculating the median of the service life in FIG. 4.

FIG. 6 is a flowchart illustrating the details of the process P3 of calculating the median of the service life of a part of each work machine 200. Upon starting the process P3 of calculating the median of the service life of a part of each work machine 200, the work machine management system 100 first executes a process P31 of extracting pieces of data. In the process P31, the processing unit 122 of the user server 120 extracts pieces of data on the work machines 200 for which the proportion of the actual work time, which is the cumulative time during which a specific operation has been performed, with respect to the total operation time is greater than or equal to a predetermined proportion, based on the operation information OI such as the one illustrated in FIG. 3 acquired in the process P1 illustrated in FIG. 4, for example.

More specifically, when the tooth 283T of the bucket 283 is the part of each work machine 200 for which the median of the service life is calculated, the processing unit 122 sets the specific operation to the digging operation. Further, the processing unit 122 extracts pieces of data on the work machines 200 for which the proportion of the actual work time of the digging operation, that is, the digging time with respect to the total operation time is greater than or equal to a predetermined proportion. Herein, the processing unit 122 extracts pieces of data on the work machines 200 for which the proportion of the digging time with respect to the total operation time is greater than or equal to 80[%], for example. It should be noted that the predetermined proportion of the actual work time with respect to the total operation time of each work machine 200 can be appropriately set to 50[%], 60[%], 70[%], 80[%], or 90[%], for example, according to circumstances.

In the process P31 of extracting pieces of data, the processing unit 122 may extract pieces of data on the work machines 200 for which the proportion of the actual work time spent for one geological name with respect to the total length of the actual work time, that is, the total actual work time is greater than or equal to a predetermined proportion. More specifically, the processing unit 122 may extract pieces of data on the work machines 200 for which greater than or equal to 80[%] of the digging time has been spent for a specific geological name, such as sand gravel. It should be noted that the predetermined proportion of the actual work time spent for one geological name with respect to the total actual work time can be appropriately set to 50[%], 60[%], 70[%], 80[%], or 90[%], for example, according to circumstances.

Next, the work machine management system 100 executes a process P32 of classifying the extracted pieces of data by category. Specifically, for example, the processing unit 122 of the user server 120 calculates a load on each work machine 200 based on the fuel consumption included in the operation information OI on the work machine 200 as illustrated in the operation daily report table TBL1 of FIG. 3. The processing unit 122 calculates a load on each work machine 200 as a load level, such as a high load, normal, or a low load, based on the fuel consumption included in the operation information OI and a program and data stored in the storage unit 123, such as a threshold, for example. For example, the processing unit 122 calculates the load level as a "high load" when the fuel consumption is greater than or equal to 24 [l/h], calculates the load level as "normal" when the fuel consumption is less than 24 [l/h] and greater than or equal to 21 [l/h], and calculates the load level as a "low load" when the fuel consumption is less than 21 [l/h].

Further, in the process P32, the processing unit 122 calculates the hardness of the surface layer ground of the site where each work machine 200 is to perform an operation, based on the elastic wave velocity included in the geological information GI. The processing unit 122 calculates the hardness of the surface layer ground as a hardness level, such as hard, medium, or soft, based on the fuel consumption included in the operation information OI and a program and data stored in the storage unit 123, such as a threshold, for example. For example, the processing unit 122 calculates the hardness level as "hard" when the mean elastic wave velocity is greater than or equal to 4.0 [km/s], calculates the hardness level as "medium" when the mean elastic wave velocity is less than 4.0 [km/s] and greater than or equal to 2.0 [km/s], and calculates the hardness level as "soft" when the mean elastic wave velocity is less than 2.0 [km/s].

Figure 7:
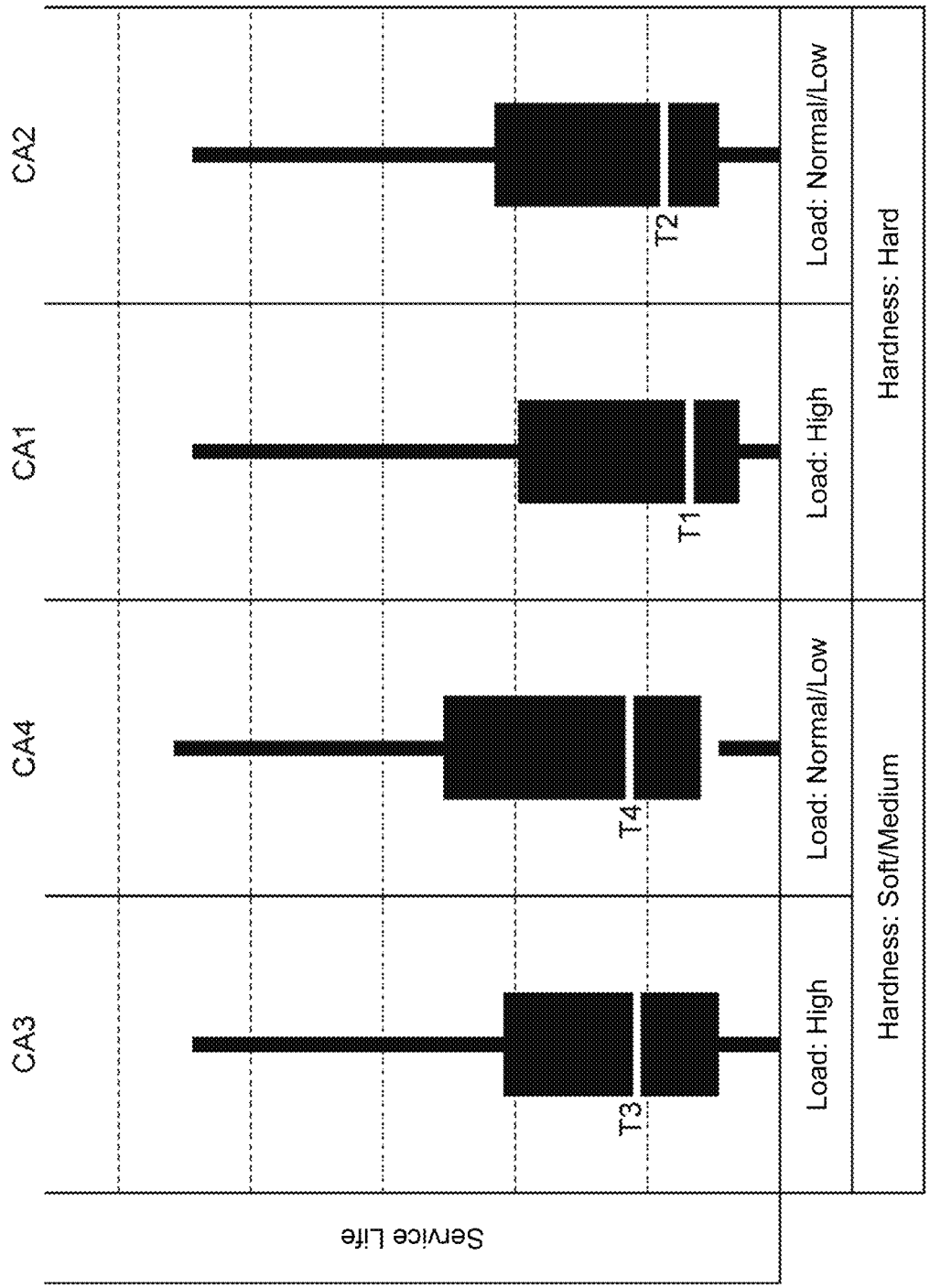
FIG. 7 is a chart illustrating a process of classifying pieces of data by category and a process of calculating the median in FIG. 6.

FIG. 7 is a graph illustrating the process P32 of classifying the pieces of data by category and a process P33 of calculating the median of the service life of the part illustrated in FIG. 6. In the process P32, the processing unit 122 sets a plurality of categories according to the levels of the elastic wave velocity and the load. Specifically, the processing unit 122 sets a plurality of categories according to the calculated load levels of the work machines 200 and the calculated hardness levels of the surface layer ground, for example. In the example illustrated in FIG. 7, the processing unit 122 sets four categories according to the load levels of the work machines 200 and the hardness levels of the surface layer ground.

More specifically, a first category CA1 is a category in which the hardness of the surface layer ground is "hard" and the load on the work machine 200 is a "high load." A second category CA2 is a category in which the hardness of the surface layer ground is "hard" and the load on the work machine 200 is "normal" or a "low load." A third category CA3 is a category in which the hardness of the surface layer ground is "medium" or "soft" and the load on the work machine 200 is a "high load." A fourth category CA4 is a category in which the hardness of the surface layer ground is "medium" or "soft" and the load on the work machine 200 is "normal" or a "low load." In the process P32, the processing unit 122 sorts the pieces of data on the plurality of work machines 200 into the set categories CA1, CA2, CA3, and CA4.

Next, the work machine management system 100 executes the process P33 of calculating the median of the service life of the part of the plurality of work machines 200 for each of the categories CA1, CA2, CA3, and CA4. More specifically, in the process P33, the processing unit 122 of the user server 120 calculates the actual work time from when a part, such as the tooth 283T, started to be used to when the part was replaced as the service life of the part based on the parts replacement history included in the operation information OI. Herein, the actual work time is the cumulative time during which each work machine 200 has performed a specific operation as described above, and corresponds to the digging time when the tooth 283T is a target part. Further, in the process P33, the processing unit 122 calculates the median T1, T2, T3, or T4 of the service life of the part of the plurality of work machines 200 for each of the categories CA1, CA2, CA3, and CA4 as illustrated in FIG. 7. Next, in the process P34, the processing unit 122 stores each of the calculated medians T1, T2, T3, and T4 of the service life of the part in the storage unit 123, and terminates the process P3 illustrated in FIG. 6.

Figure 8:
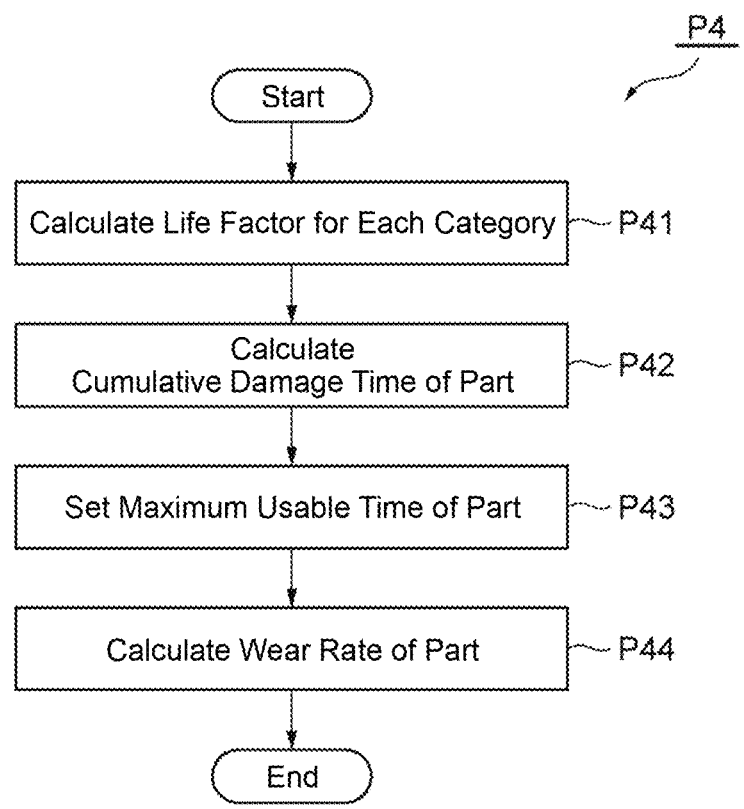
FIG. 8 is a flowchart illustrating the details of a process of calculating the wear rate in FIG. 4.
Figure 9:
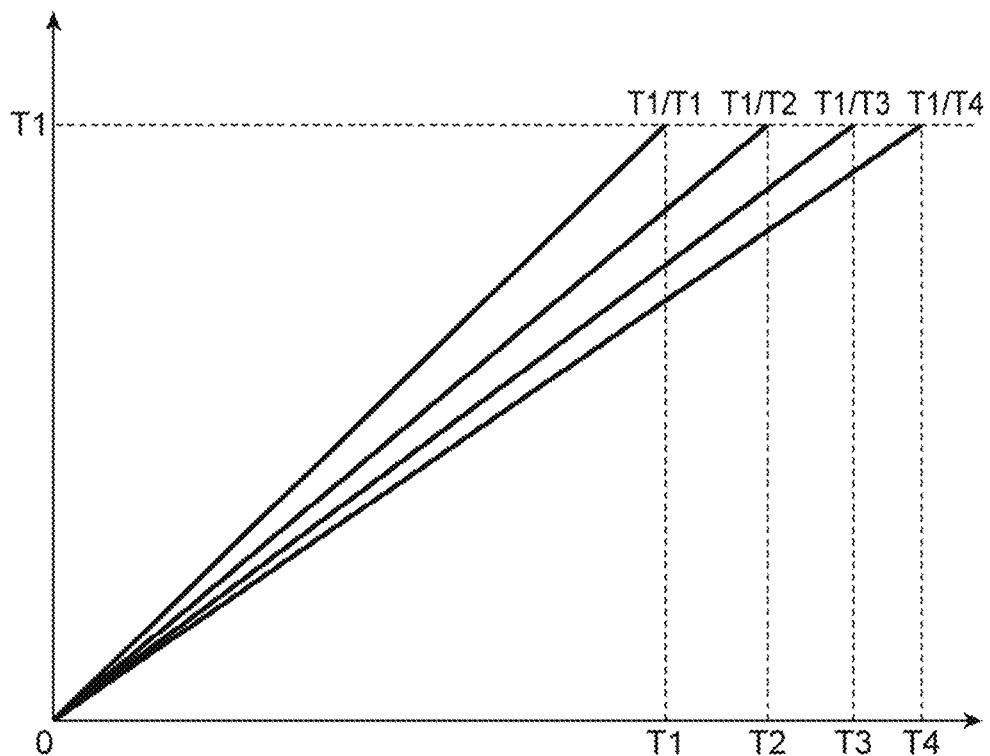
FIG. 9 is a chart illustrating a process of calculating the life factor in FIG. 8.

Next, the work machine management system 100 executes a process P4 of calculating the wear rate illustrated in FIG. 4. Hereinafter, the process P4 of calculating the wear rate will be described in detail with reference to FIGS. 8 and 9. FIG. 8 is a flowchart illustrating the details of the process P4 of calculating the wear rate. FIG. 9 is a graph illustrating an example of the life factor. Upon starting the process P4 of calculating the wear rate, the work machine management system 100 first executes a process P41 of calculating the life factor T1/T1, T1/T2, T1/T3, or T1/T4 for each of the categories CA1, CA2, CA3, and CA4.

In the process P41, the work machine management system 100 calculates, with the processing unit 122 of the user server 120, for example, the life factor T1/T1, T1/T2, T1/T3, or T1/T4 for each category by dividing the median T1 of the service life of the category CA1 with the maximum elastic wave velocity and the maximum load by the median T1, T2, T3, or T4 of the service life of each category. That is, the processing unit 122 calculates, as the life factor T1/T1, T1/T2, T1/T3, or T1/T4 for each category, the ratio of the median T1 of the service life of the category CA1, which has the maximum hardness level "hard" based on the elastic wave velocity and has the maximum load level "high load," to the median T1, T2, T3, or T4 of the service life of each category.

Next, the work machine management system 100 executes a process P42 of calculating the cumulative damage time of the part of each work machine 200. In the process P42, the work machine management system 100 calculates, with the processing unit 122 of the user server 120, for example, the sum of the product of the actual work time and the life factor of each work machine 200 for each of the categories CA1, CA2, CA3, and CA4, as the cumulative damage time of the part. Specifically, the processing unit 122 calculates the product of the digging time and the life factor T1/T1, T1/T2, T1/T3, or T1/T4 of each work machine 200 for each of the categories CA1, CA2, CA3, and CA4, and determines the sum of the calculated values as the cumulative damage time of the tooth 283T.

Next, the work machine management system 100 executes a process P43 of setting the maximum usable time of the part of each work machine 200. In the process P43, the work machine management system 100 sets, with the processing unit 122 of the user server 120, for example, the median T1 of the service life of the part in the category CA1 with the maximum elastic wave velocity and the maximum load, as the maximum usable time of the part. Specifically, the processing unit 122 sets as the maximum usable time of the tooth 283T the median T1 of the service life of the tooth 283T of the plurality of work machines 200 in the category CA1 with the maximum hardness level and the maximum load level, for example.

Next, the work machine management system 100 executes a process P44 of calculating the wear rate of the part of each work machine 200. In the process P44, the work machine management system 100 calculates, with the processing unit 122 of the user server 120, for example, the percentage of the cumulative damage time with respect to the maximum usable time of each part, as the wear rate of the part.

Figure 10:
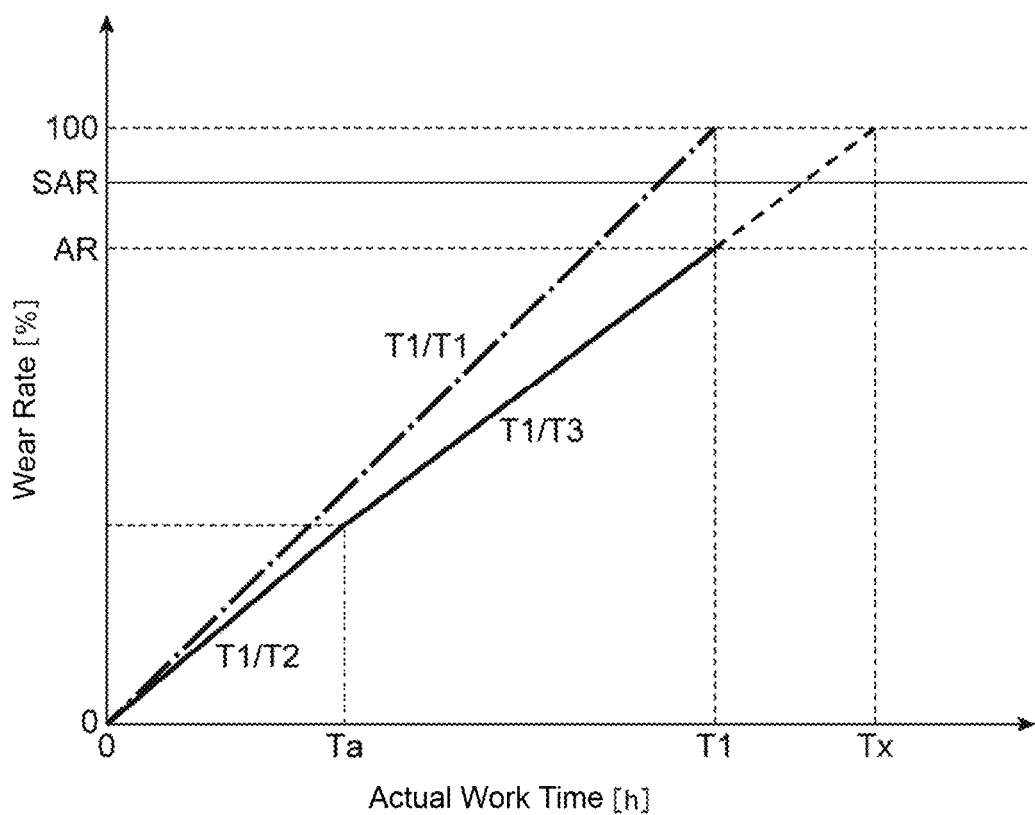
FIG. 10 is a chart illustrating each process performed after the process of calculating the wear rate in FIG. 4.

FIG. 10 is a graph illustrating an example of the results of the process P44 of calculating the wear rate of the part of each work machine 200. When the median T1 of the service life of the part in the category CA1 with the maximum elastic wave velocity and the maximum load is set as the maximum usable time of the part, the wear rate when the actual work time has reached the median T1 of the service life is 100[%]. In the example illustrated in FIG. 10, in the period when the actual work time is from zero to Ta, a specific operation is performed with the work machine 200 in the category CA2 with a life factor of T1/T2, and in the period when the actual work time is from Ta to T1, a specific operation is performed with the work machine 200 in the category CA3 with a life factor of T1/T3.

In such a case, the sum of the product of the actual work time Ta and the life factor T1/T2 and the product of the actual work time (T1−Ta) and the life factor T1/T3 corresponds to the cumulative damage time. In addition, the percentage AR[%] of the cumulative damage time with respect to the median T1 of the service life, which is the maximum usable time of the part, is the wear rate of the part at the actual work time T1. In this manner, in the process P44, the processing unit 122 calculates the wear rate of each part of each work machine 200, such as the tooth 283T and each part of the travel unit 260, for example, and terminates the process P4 illustrated in FIG. 8.

Next, the work machine management system 100 executes a process P5 of determining if the wear rate of each part of each work machine 200 calculated in the process P4 is greater than or equal to a threshold as illustrated in FIG. 4. In the process P5, the processing unit 122 of the user server 120 determines if the calculated wear rate AR is greater than or equal to a threshold SAR as illustrated in FIG. 10, for example. The threshold of the wear rate of each part of each work machine 200 is stored in the storage unit 123 of the user server 120, for example.

In the process P5, if the processing unit 122 determines that the wear rate AR is less than the threshold SAR (NO), the work machine management system 100 repeatedly executes the processes from P1 to P5 illustrated in FIG. 4. Meanwhile, in the process P5, if the processing unit 122 determines that the wear rate AR is greater than or equal to the threshold SAR (YES), the work machine management system 100 executes a process P6 of issuing an alert illustrated in FIG. 4. In the process P6, the processing unit 122 of the user server 120 transmits alert information to the management server 110, the work machine 200, and the portable terminal 130 via the input/output unit 121 and the Internet line 400, for example. That is, in response to a request from the external portable terminal 130, the input/output unit 121 of the user server 120 outputs to the portable terminal 130 data on an alert based on the maintenance timing of the work machine 200 predicted by the processing unit 122.

The management server 110 receives the alert information via the input/output unit 111, for example, and then, the processing unit 112 displays the alert on the display unit 114. The work machine 200 receives the alert information via the communication unit 230 and the input/output unit 211, for example, and then, the processing unit 212 displays the alert on the display unit 220. The portable terminal 130 receives the alert information via the communication unit 135 and the input/output unit 131, for example, and then, the processing unit 132 displays the alert on the display unit 134.

Figure 11:
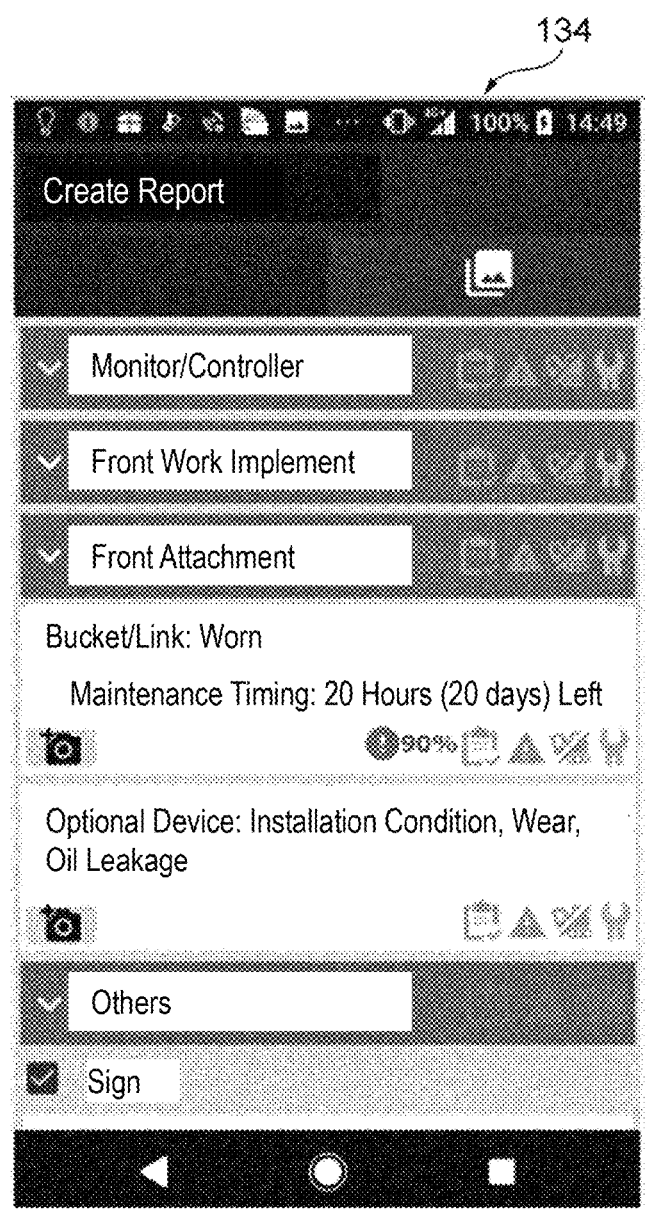
FIG. 11 is a view illustrating a process of issuing an alert and a process of displaying information in FIG. 4.

FIG. 11 is a view of an image illustrating an example of an alert displayed on the display unit 134 of the portable terminal 130. In the example illustrated in FIG. 11, the display unit 134 displays an alert indicating that the wear rate is greater than or equal to 90% in the item of "Bucket/Link Worn" of "Front Attachment." It should be noted that the portable terminal 130 may issue an alarm from a speaker at the same time as displaying an alert on the display unit 134.

Next, the work machine management system 100 executes a process P7 of predicting the maintenance timing of each part of each work machine 200 as illustrated in FIG. 4. The work machine management system 100 predicts, with the processing unit 122 of the user server 120, for example, the maintenance timing based on the wear rate AR illustrated in FIG. 10. Specifically, in the example illustrated in FIG. 10, the processing unit 122 calculates the actual work time Tx when the wear rate reaches 100[%] based on the current wear rate AR of the part and the current life factor T1/T3 of the work machine 200, and then predicts the maintenance timing of the part based on the actual work time T1 so far and the calculated actual work time Tx.

Next, the work machine management system 100 executes a process P8 of displaying information as illustrated in FIG. 4. In the process P8, the work machine management system 100 transmits information on the predicted maintenance timing to the management server 110, the work machine 200, and the portable terminal 130 from the processing unit 122 of the user server 120 via the input/output unit 121 and the Internet line 400, for example.

The management server 110 receives the information on the maintenance timing via the display unit 114, for example, and then, the processing unit 112 displays the information on the display unit 114. The work machine 200 receives the information on the maintenance timing via the communication unit 230 and the input/output unit 211, for example, and then, the processing unit 212 displays the information on the display unit 220. The portable terminal 130 receives the information on the maintenance timing via the communication unit 135 and the input/output unit 131, for example, and then, the processing unit 132 displays the information on the display unit 134.

FIG. 11 illustrates an example of the maintenance information displayed on the display unit 134 of the portable terminal 130. In the example illustrated in FIG. 11, the display unit 134 displays information to the effect that the remaining operable time is 20 hours and the remaining operable days are 20 days as the maintenance timing in the item of "Bucket/Link Worn" of "Front Attachment." Accordingly, the work machine management system 100 terminates the process illustrated in FIG. 4.

Hereinafter, the function of the work machine management system 100 and the work machine management device according to the present embodiment will be described.

As described above, the work machine management system 100 of the present embodiment includes the input/output unit 121 and the processing unit 122. The input/output unit 121 receives from the work machines 200 the positional information PI and the operation information OI on the work machines 200, and also receives from the geographical information system server 300 the geological information GI on an area where the work machines 200 are to perform an operation, based on the positional information PI. The processing unit 122 predicts the maintenance timing of each work machine 200 based on the operation information OI and the geological information GI.

It should be noted that in the present embodiment, the user server 120, even alone, functions as a work machine management device. The user server 120 as a work machine management device includes the input/output unit 121 and the processing unit 122. The input/output unit 121 receives from the work machines 200 the positional information PI and the operation information OI on the work machines 200, and also receives from the geographical information system server 300 the geological information GI on an area where the work machines 200 are to perform an operation, based on the positional information PI. In addition, the processing unit 122 predicts the maintenance timing of each work machine 200 based on the operation information OI and the geological information GI.

According to such a configuration, the work machine management system 100 of the present embodiment as well as the user server 120 as a work machine management device can predict the maintenance timing of each work machine 200 with higher accuracy than conventional techniques. For example, the conventional shovel support device described in Patent Literature 1 above cannot predict a load to be applied to a shovel when the shovel performs an operation at a site where the shovel has never performed an operation in the past. In contrast, the work machine management system 100 of the present embodiment as well as the user server 120 as a work machine management device can predict the maintenance timing of each work machine 200 based on the positional information PI and the operation information OI on the work machine 200 and the geological information GI acquired from the geographical information system server 300.

Therefore, the work machine management system 100 of the present embodiment as well as the user server 120 as a work machine management device can, even when the work machine 200 performs an operation at a site where the work machine 200 has never performed an operation in the past, predict a load to be applied to each part of the work machine 200, and thus predict the maintenance timing of the work machine 200 with higher accuracy than conventional techniques. In addition, since the work machine management system 100 of the present embodiment as well as the user server 120 as a work machine management device acquires the geological information GI from the geographical information system server 300 based on the positional information PI on the work machine 200, there is no need to measure the geological information GI including the hardness of the surface layer ground of a site where the work machine 200 is to perform an operation, which is advantageous.

It should be noted that the management server 110, even alone, may form a work machine management device as described above. In such a case, the management server 110 as a work machine management device includes the input/output unit 111 and the processing unit 112. The input/output unit 111 receives from the work machines 200 the positional information PI and the operation information OI on the work machines 200, and also receives from the geographical information system server 300 the geological information GI on an area where the work machines 200 are to perform an operation, based on the positional information PI. The processing unit 112 predicts the maintenance timing of each work machine 200 based on the operation information OI and the geological information GI. In such a case also, advantageous effects similar to those of the aforementioned work machine management system 100 can be achieved.

In addition, the portable terminal 130, even alone, may form a work machine management device as described above. In such a case, the portable terminal 130 as a work machine management device includes the input/output unit 131, the processing unit 132, and the display unit 134. The input/output unit 131 receives from the work machines 200 the positional information PI and the operation information OI on the work machines 200, and also receives from the geographical information system server 300 the geological information GI on an area where the work machines 200 are to perform an operation, based on the positional information PI. The processing unit 132 predicts the maintenance timing of each work machine 200 based on the operation information OI and the geological information GI. The display unit 134 displays an alert based on the maintenance timing of each work machine 200 predicted by the processing unit 132. In such a case also, advantageous effects similar to those of the aforementioned work machine management system 100 can be achieved.

In the work machine management system 100 and the work machine management device of the present embodiment, the operation information OI on each work machine 200 includes information on the fuel consumption of the work machine 200. In addition, the processing unit 122 calculates a load on each work machine 200 based on the fuel consumption of the work machine 200, and predicts the maintenance timing of each part of each work machine 200 based on the load on the work machine 200 and the geological information GI.

According to such a configuration, the work machine management system 100 and the work machine management device of the present embodiment need not measure a force applied to each part of each work machine 200 to predict the maintenance timing of the part. Therefore, there is no need to provide a special sensor on the work machine 200, and it is thus possible to simplify the configuration of the work machine management system 100 and the work machine management device, and facilitate the introduction of the work machine management system 100 and the work machine management device.

In the work machine management system 100 and the work machine management device of the present embodiment, the geological information GI includes a distribution of the elastic wave velocity of an area where the work machines 200 are to perform an operation. In addition, the processing unit 122 predicts the maintenance timing of each part of each work machine 200 based on the load on the work machine 200 and the elastic wave velocity corresponding to the positional information PI.

According to such a configuration, the work machine management system 100 and the work machine management device of the present embodiment can predict the maintenance timing of each part of each work machine 200 based on the load on the work machine 200 and the elastic wave velocity that is an index of the hardness of the surface layer ground of a site where each work machine 200 is to perform an operation. Accordingly, it is possible to predict with higher accuracy the maintenance timing of a part, such as the tooth 283T of the bucket 283, that wears at a different rate depending on the load on the work machine 200 and the hardness of the surface layer ground, for example.

In addition, in the work machine management system 100 and the work machine management device of the present embodiment, the operation information OI on each work machine 200 includes the actual work time that is the cumulative time during which the work machine 200 has performed a specific operation. In addition, the processing unit 122 sets a plurality of categories CA1, CA2, CA3, and CA4 according to the levels of the elastic wave velocity and the load, and calculates the life factor T1/T1, T1/T2, T1/T3, or T1/T4 of each part of each work machine 200 for each of the set categories. Further, the processing unit 122 calculates, as the cumulative damage time of each part, the sum of the product of the actual work time and the life factor of each work machine 200 for each of the categories CA1, CA2, CA3, and CA4, and predicts the maintenance timing based on the cumulative damage time.

According to such a configuration, the work machine management system 100 and the work machine management device of the present embodiment can predict with higher accuracy the maintenance timing of each part of each work machine 200 that varies depending on the level of the elastic wave velocity of the surface layer ground of a site where the work machine 200 performs an operation and the level of the load on the work machine 200. In addition, classifying pieces of data on the plurality of work machines 200 into the categories CA1, CA2, CA3, and CA4 and calculating the cumulative damage time of each part for each category can reduce the amount of processing performed by the processing unit 122 and facilitate the prediction of the maintenance timing of each part.

In addition, in the work machine management system 100 and the work machine management device of the present embodiment, the operation information OI on each work machine 200 includes a parts replacement history of the work machine 200. In addition, the processing unit 122 calculates the actual work time from when a part started to be used to when the part was replaced as the service life of the part based on the parts replacement history of each work machine 200, and calculates the median T1, T2, T3, or T4 of the service life of the part of the plurality of work machines 200 for each of the categories CA1, CA2, CA3, and CA4. Further, the processing unit 122 calculates the life factor T1/T1, T1/T2, T1/T3, or T1/T4 of each category by dividing the median T1 of the category CA1 with the maximum elastic wave velocity and the maximum load by the median T1, T2, T3, or T4 of each of the categories CA1, CA2, CA3, and CA4.

According to such a configuration, the work machine management system 100 and the work machine management device of the present embodiment can classify the operations of the work machines 200 into the several categories CA1, CA2, CA3, and CA4, and predict the maintenance timing of each part based on the life factor T1/T1, T1/T2, T1/T3, or T1/T4 of each category. Accordingly, it is possible to predict with high accuracy the maintenance timing of each part of each work machine 200 for each of the categories CA1, CA2, CA3, and CA4 in which corresponding parts of the work machines 200 wear at different rates.

In addition, in the work machine management system 100 and the work machine management device of the present embodiment, the processing unit 122 extracts pieces of operation information OI on the work machines 200 for which the proportion of the actual work time with respect to the total operation time of each work machines 200 is greater than or equal to a predetermined proportion. Then, the processing unit 122 calculates the service life of each part based on each of the parts replacement histories of the plurality of work machines 200 included in the extracted pieces of operation information OI.

According to such a configuration, the work machine management system 100 and the work machine management device of the present embodiment can calculate the service life of each part by excluding the time during which each work machine 200 performs an operation that has little influence on the wear of each part. Therefore, according to the work machine management system 100 and the work machine management device of the present embodiment, it is possible to predict the service life of each part of each work machine 200 with higher accuracy, and thus predict the maintenance timing of each part of each work machine 200 with higher accuracy.

In addition, in the work machine management system 100 and the work machine management device of the present embodiment, the processing unit 122 sets the median T1 of the service life of each part in the category CA1 with the maximum elastic wave velocity and the maximum load as the maximum usable time of the part. In addition, the processing unit 122 calculates the percentage of the cumulative damage time with respect to the maximum usable time as the wear rate AR of each part, and predicts the maintenance timing of each part of each work machine 200 based on the wear rate AR.

According to such a configuration, the work machine management system 100 and the work machine management device of the present embodiment can calculate the wear rate AR of each part of each work machine 200 with reference to the median T1 of the service life of the part in the category in which the part of the work machine 200 wears the fastest, that is, the category CA1 with the maximum elastic wave velocity and the maximum load. Therefore, according to the work machine management system 100 and the work machine management device of the present embodiment, it is possible to predict the maintenance timing of each part of each work machine 200 with higher accuracy.

In addition, in the work machine management system 100 and the work machine management device of the present embodiment, the geological information GI includes a distribution of geological names in an area where the work machines 200 are to perform an operation. The processing unit 122 predicts the maintenance timing of each part of each work machine 200 based on the load on the work machine 200 and the geological name.

According to such a configuration, the work machine management system 100 and the work machine management device of the present embodiment can predict with higher accuracy the maintenance timing of each part based on wear resulting from the soil quality or rock quality of a site where each work machine 200 is to perform an operation, for example. Specifically, it is possible to predict with high accuracy the maintenance timing of the sprocket 261, the idler 262, the link assembly 263, the upper roller 264, the lower roller 265, or the shoe plates 266, for example, based on the influence of wear caused by particles that have entered into the gap between the parts of the travel unit 260 of the work machine 200 that performs an operation at a site corresponding to a specific geological name, for example.

Although the embodiment of the work machine management system and the work machine management device according to the present disclosure has been described in detail above with reference to the drawings, any design changes that are within the spirit and scope of the present disclosure are included in the present disclosure.

REFERENCE SIGNS LIST

100 Work machine management system
110 Management server (work machine management device)
111 Input/output unit
112 Processing unit
120 User server (work machine management device)
121 Input/output unit
122 Processing unit
130 Portable terminal (work machine management device)

131 Input/output unit
132 Processing unit
134 Display unit
200 Work machine
300 Geographical information system server
CA1 Category
CA2 Category
CA3 Category
CA4 Category
GI Geological information
OI Operation information
PI Positional information
AR Wear rate
T1 Median
T2 Median
T3 Median
T4 Median
T1/T Life factor
T1/T2 Life factor
T1/T3 Life factor
T1/T4 Life factor

The invention claimed is:

1. A work machine management system comprising:
an input/output unit that receives from work machines positional information and operation information on the work machines, and also receives from a geographical information system server geological information on an area where the work machines are to perform an operation, based on the positional information; and
a processing unit that performs a process of calculating a load on each work machine based on fuel consumption of each work machine included in the operation information, a process of calculating, based on a distribution of elastic wave velocity of the area where the work machines are to perform the operation included in the geological information, the elastic wave velocity corresponding to the positional information, a process of calculating, based on the load on each work machine and the elastic wave velocity corresponding to the positional information, a wear rate of a part of each work machine, and a process of predicting a maintenance timing of each work machine based on the wear rate,
wherein:
in response to a request from an external portable terminal, the input/output unit outputs to the external portable terminal data on an alert based on the maintenance timing of the work machine predicted by the processing unit.

2. The work machine management system according to claim 1,
wherein:
the operation information includes an actual work time that is a cumulative time of a specific operation of each work machine, and
the processing unit performs a process of setting a plurality of categories according to levels of the elastic wave velocity and the load, a process of calculating a life factor of the part for each category, a process of calculating as a cumulative damage time of the part a sum of a product of the actual work time and the life factor of each work machine for each category, and a process of calculating the wear rate of the part based on the cumulative damage time.

3. The work machine management system according to claim 2,
wherein:
the operation information includes a replacement history of the part, and
the processing unit performs a process of calculating as a service life of the part the actual work time from when the part started to be used to when the part was replaced based on the replacement history, a process of calculating a median of the service life of the part of the plurality of work machines for each category, and a process of calculating the life factor for each category by dividing the median of the category with a maximum elastic wave velocity and a maximum load by the median of each category.

4. The work machine management system according to claim 3, wherein the processing unit performs a process of extracting operation information on work machines each having a proportion of an actual work time with respect to a total operation time that is greater than or equal to a predetermined proportion, and a process of calculating the service life based on the replacement history in the extracted operation information.

5. The work machine management system according to claim 4, wherein the processing unit performs a process of setting as a maximum usable time of the part the median of the category with the maximum elastic wave velocity and the maximum load, and a process of calculating as the wear rate of the part a percentage of the cumulative damage time with respect to the maximum usable time.

6. The work machine management system according to claim 3, wherein the processing unit performs a process of setting as a maximum usable time of the part the median of the category with the maximum elastic wave velocity and the maximum load, and a process of calculating as the wear rate of the part a percentage of the cumulative damage time with respect to the maximum usable time.

* * * * *